United States Patent Office 3,851,054
Patented Nov. 26, 1974

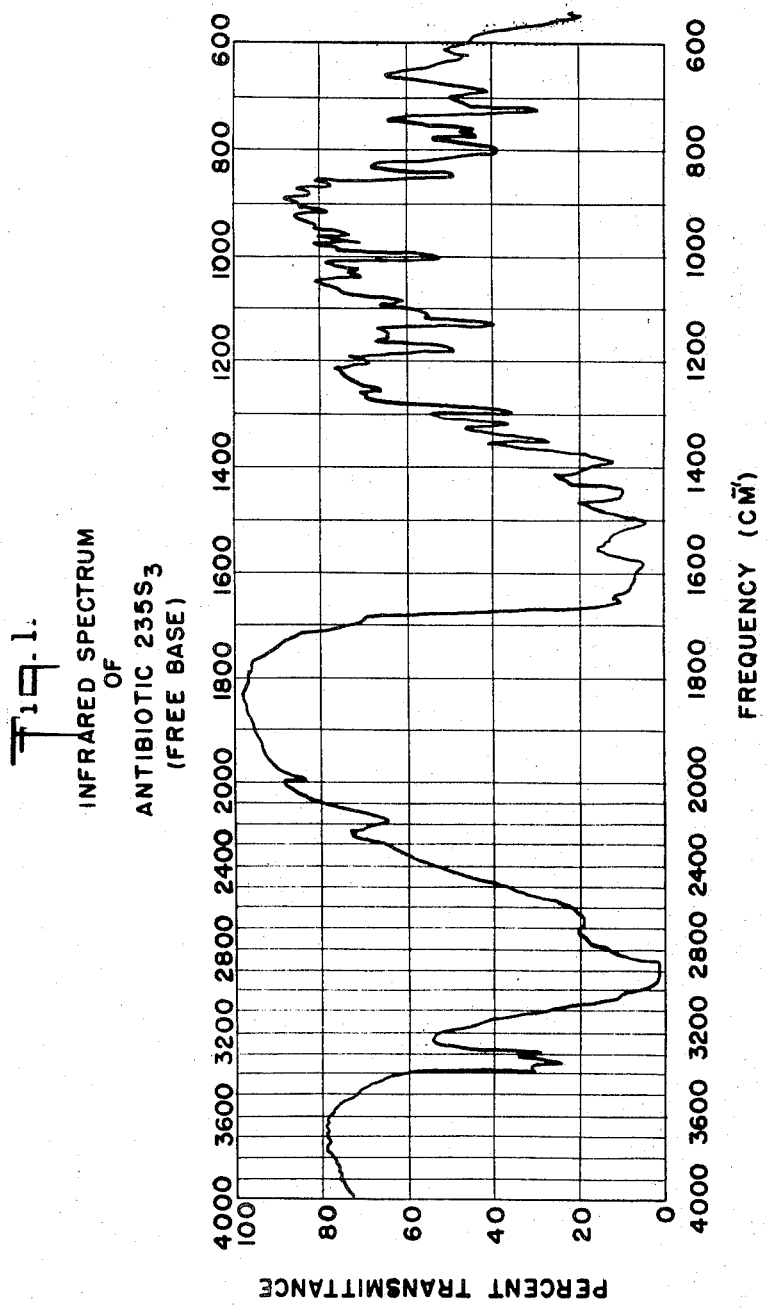

3,851,054
ANTIBIOTIC 235A AND PROCESS FOR PREPARATION
Louis Chaiet, Springfield, N.J., and Justo Mata, Madrid, Spain, assignors to Merck & Co., Inc., Rahway, N.J.
Continuation of application Ser. No. 704,949, Feb. 12, 1968, which is a continuation of application Ser. No. 313,477, Oct. 3, 1963, both now abandoned. This application Oct. 20, 1969, Ser. No. 867,968
Int. Cl. A61k 21/00
U.S. Cl. 424—122                                5 Claims

ABSTRACT OF THE DISCLOSURE

Antibiotic 235A is produced by growing *Streptomyces lavendulae* or *Streptomyces avidinii* in suitable fermentation mediums. It consists of at least two substances, 235S and 235L, which act synergistically in inhibiting the growth of various pathogenic microorganisms.

---

This application is a continuation of Ser. No. 704,949, filed Feb. 12, 1968, now abandoned which in turn is a continuation of Ser. No. 313,477 filed Oct. 3, 1963, now abandoned.

This invention relates to new antibiotic agents and to the process for preparing same. More particularly, it is concerned with a novel antibiotic material known as Antibiotic 235A (or, alternatively, as Antibiotic MSD 235) and processes for the production of this new substance.

The discovery of the remarkable therapeutic properties of penicillin stimulated great interest in this field, which has resulted in the finding of many other valuable antibiotics such as streptomycin, bacitracin, chloramphenicol, tetracycline, erythromycin, novobiocin and the like. In general, such antibiotics are particularly active against certain gram positive bacteria. Others are active against gram negative bacteria. However the activity of these individual antibiotics is usually limited to a few strains of pathogenic microorganisms and work has continued in this field in an effort to find other antibiotics which are effective against other pathogenic microorganisms.

Although some of these antibiotics have been found to be valuable in the treatment of various diseases, it is found that certain strains of pathogenic microorganisms develop resistance to a particular antibiotic and, as a result, the antibiotic is no longer active against those particular strains.

Accordingly, the deficiencies of the known antibiotics have stimulated research to find other antibiotics which will be active against a wider range of pathogens and, more particularly, to find antibiotics which will be active against resistant strains of pathogenic microorganisms.

It is an object of the present invention to provide a new and useful antibiotic which is highly effective in inhibiting the growth of pathogenic bacteria, particularly the gram negative bacteria.

Another object is to provide a process for preparing this novel antibiotic substance by the fermentation of nutrient mediums with suitable strains of species of microorganisms selected from the *Streptomyces* genus.

Other objects will be apparent from the detailed description hereinafter provided.

The new antibiotic substance of the present invention is formed by growing under controlled conditions strains of microorganisms selected from certain species of *Streptomyces*. Two such species have been designated as *Streptomyces lavendulae* and *Streptomyces avidinii*. These two cultures have been deposited at the Northern Utilization Research Branch of the U.S.D.A. under the numbers NRRL 3076 and 3077, respectively (our Nos. MA 669 and 833, respectively).

The morphological and cultural characteristics of the antibiotic 235A-producing strains of Streptomyces are set forth in the following table.

DESCRIPTION OF CULTURAL CHARACTERISTICS OF ORGANISMS WHICH PRODUCE ANTIBIOTIC 235A (incubation 20 days at 28° C.)

Tomato Paste—Oatmeal Agar Plates

Cultures MA–669, MA–788, MA–831 and MA–872 exhibit abundant, flat, velvety, white tufts; red (5dc) aerial mycelium; and brown reverse color.

Culture MA–751 exhibits abundant, slightly elevated, velvety, white tufts; red (5dc) aerial mycelium; and brown to black reverse color.

Cultures MA–771 and MA–861 exhibit abundant, flat, velvety, white tufts; red (5dc) aerial mycelium; and brown to black reverse color.

Cultures MA–819, MA–842 and MA–926 exhibit abundant, slightly elevated, velvety, white tufts; red (5dc) aerial mycelium; and brown reverse color.

Culture MA–833 exhibits abundant, flat, velvety, white tufts; gray (5fe) aerial mycelium; and brown reverse color.

Culture MA–936 exhibits abundant, slightly elevated, velvety, white tufts; red (5cd) aerial mycelium; and dark brown reverse color.

Czapek Agar Plates

Cultures MA–669, MA–751, MA–771, MA–788, MA–819, MA–831, MA–833, MA–842, MA–861, MA–872, MA–926 and MA–936 exhibit thin, spreading, colorless to cream-colored growth; white (a)→red (5cd) aerial mycelium; no soluble pigment, and white (b) reverse color.

*Streptomyces lavendulae* exhibits thin, spreading, colorless to cream-colored growth; cottony white→vinaceous-lavendar aerial mycelium; and no soluble pigment.

Klycerol-Asparagine Agar Plates

Cultures MA–669, MA–751, MA–771, MA–788, MA–819, MA–831, MA–833, MA–842, MA–861, MA–872, MA–926 and MA–936 exhibit no soluble pigment.

Synthetic Agar (Glucose-Asparagine Agar) Plates

Culture MA–669 exhibits good, flat, velvety growth; red (5dc) aerial mycelium; no soluble pigment and yellow (ldc) reverse color.

Culture MA–751 exhibits abundant, flat, velvety growth; red (5dc) aerial mycelium; no soluble pigment and yellow (2db) reverse color.

Culture MA–771 exhibits abundant, flat velvety growth; red (5dc) aerial mycelium; no soluble pigment and yollow (2fb) reverse color.

Culture MA–788 exhibits fair, flat, velvety growth; white (a) aerial mycelium, no soluble pigment, and white (a) reverse color.

Culture MA–819 exhibits good, elevated, velvety growth; red (5ge) aerial mycelium; no soluble pigment, any yellow (2db) reverse color.

Culture MA–831 exhibits good, flat, velvety growth; red (6ec) aerial mycelium, no soluble pigment, and yellow (2db) reverse color.

Culture MA–833 exhibits abundant, flat, velvety, white tufts; gray (5fe) aerial mycelium; no soluble pigment, and gray (2ih) reverse color.

Culture 842 exhibits good, flat, velvety growth; white (a) aerial mycelium; no soluble pigment and yellow (2fb) reverse color.

Culture 861 exhibits good, flat, velvety growth; red (5cb-5dc) aerial mycelium; no soluble pigment, and yellow (2bd-2fb) reverse color.

Culture MA-872 exhibits abundant, flat, velvety white tufts; red (5dc) aerial mycelium; no soluble pigment and yellow (2fb) reverse color.

Culture MA-926 exhibits good, flat, velvety growth; white (a) aerial mycelium; no soluble pigment; and yellow (2fb) reverse color.

Culture MA-936 exhibits abundant, flat, velvety growth; red (4ge) aerial mycelium; no soluble pigment and golden brown reverse color.

*Streptomyces lavendulae* exhibits yellowish growth; and white with lavendar tinge aerial mycelium.

Potato Wedge

Culture MA-669 exhibits fair growth; gray (d) aerial mycelium and brownish-black soluble pigment.

Culture MA-751 exhibits abundant growth; gray→red (5dc) aerial mycelium and brownish-black soluble pigment.

Culture MA-771 exhibits abundant, cream-colored growth; gray→red (5dc) aerial mycelium and brown soluble pigment.

Culture MA-788 exhibits fair, brown growth; red (5dc) aerial mycelium and brownish-black soluble pigment.

Cultures MA-819 and MA-831 exhibit fair, brown growth; gray (e) aerial mycelium and brownish-black soluble pigment.

Culture MA-833 exhibits abundant, brown growth; gray (2dc) aerial mycelium and brownish-black soluble pigment.

Culture MA-842 exhibits good, brown growth; gray (e) aerial mycelium and brownish-black soluble pigment.

Culture MA-861 exhibits abundant, brown growth; gray (2dc-g) aerial mycelium and brownish-black soluble pigment.

Culture MA-872 exhibits abundant, cream-colored growth; gray (d) aerial mycelium and brown soluble pigment.

Culture MA-926 exhibits good, cream-colored growth; gray (2dc) aerial mycelium and brown soluble pigment.

Culture MA-936 exhibits abundant growth; red (5ca-7ca) aerial mycelium and red soluble pigment.

*Streptomyces lavendulae* exhibits thin, wrinkled, cream to yellowish growth; no aerial mycelium and black soluble pigment.

Gelatin Stab (Liquefaction)

Cultures MA-669, MA-861 and MA-936 exhibit cream colored growth, no aerial mycelium, brown soluble pigment and slowly liquefy the gelatin medium.

Cultures MA-751, MA-771 and MA-819 exhibit cream to dark brown growth; no aerial mycelium, brown soluble pigment and slowly liquefy the gelatin medium.

Cultures MA-788, MA-831, MA-833, MA-842, MA-872 and MA-926 exhibit cream colored growth, gray aerial mycelium, brown soluble pigment and slowly liquefy the gelatin medium.

*Streptomyces lavendulae* exhibits cream to brownish surface growth, no aerial mycelium or white aerial mycelium, brown soluble pigment and slowly liquefy the gelatin medium.

Hydrogen sulfide is produced by each of the microorganisms, including *Streptomyces lavendulae*.

When grown on starch agar plates, starch is hydrolyzed by *Streptomyces lavendulae* and each of the twelve cultures.

On nitrite agar, the following cultures reduce nitrates to nitrites: MA-751, MA-771, MA-831, MA-842. The remaining cultures, MA-669, MA-788, MA-819, MA-833, MA-861, MA-872, MA-926, MA-936 and *Streptomyces lavendulae* cause no discernible reduction of nitrates to nitrites.

CARBON UTILIZATION

| | Glucose | Xylose | Arabinose | Rhamnose | Raffinose | Mannose | Lactose |
|---|---|---|---|---|---|---|---|
| MA-669 | + | - | - | - | - | ± | - |
| MA-751 | + | + | + | - | - | - | - |
| MA-771 | + | + | + | - | - | - | - |
| MA-788 | + | - | + | - | - | - | - |
| MA-819 | + | - | + | - | ± | - | + |
| MA-831 | + | - | - | - | - | - | - |
| MA-833 | + | - | - | - | - | - | - |
| MA-842 | + | - | - | - | - | - | - |
| MA-861 | + | + | + | - | - | - | - |
| MA-872 | + | + | + | - | - | - | - |
| MA-926 | + | - | - | - | - | - | ± |
| MA-936 | + | - | - | - | - | - | - |
| *Streptomyces lavendulae* | + | Variable | Variable | - | - | + | - |

The above description of the microorganisms producing Antibiotic 235A is sufficient to classify the eleven strains, MA-669, MA-751, MA-771, MA-788, MA-819, MA-831, MA-842, MA-861, MA-872, MA-926 and MA-936 as members of the *Streptomyces lavendulae* species and to classify culture MA-833 as a new species of streptomycin for which the name *Streptomyces avidinii* is assigned in view of the unusual nature of the culture and of the discovery that a biotin-binding agent, Streptavidin, can be produced. It should be understood that the present invention is not limited to organisms answering this particular description. The present invention also contemplates the use of other strains of *Streptomyces lavendulae* and *Streptomyces avidinii* which are mutants of the described organisms, such as those mutants obtained by natural selection, those produced by mutating agents, for example, X-ray irradiation, ultraviolet irradiation, nitrogen mustards, and the like.

The microorganisms which are described above have been obtained from soils of scattered locations throughout the world. The culture MA-833 was isolated from a soil found in Spain. The other cultures described were isolated from soils found in Nebraska, Massachusetts, West Virginia, Ohio and Utah, in the United States, as well as locations in Europe and South America.

Superficial examination of the twelve cultures, when grown on complex media, indicates that they differ greatly from one another. The different soils, therefore, yield distinct strains of cultures, all belonging to the genus *Streptomyces*.

In reducing these strains to a species classification, the keys employed are those described in Bergey's *Manual of Determinative Bacteriology*, Seventh Edition; and in the article appearing in *Applied Microbiology 5*, 52–79 (1958) "A Guide for the Classification of Streptomycetes According to Selected Groups" by Pridham, Hesseltine and Benedict.

Detailed comparisons were made between the 235A antibiotic-producing cultures and the characteristics published in Bergey's Manual or in *The Actinomycetes*, vol. 2 Classification, Identification and Descriptions of Genera and Species, S. A. Waksman (1961) for related cultures, as selected from the keys.

The twelve cultures, MA-669, MA-751, MA-771, MA-788, MA-819, MA-831, MA-833, MA-842, MA-861, MA-872, MA-926 and MA-936, all produce abundant dark soluble pigment when grown on organic media such as tomato paste agar or potato and, likewise, produce hydrogen sulfide. All of the cultures, with the exception of MA-833, produce lavendar-colored spores on complex culture mediums. When examined by the key to the *Streptomycetes* published in Bergey's *Manual of Determinative Bacteriology*, Seventh Edition, the cultures fulfill the requirements for *Streptomyces lavendulae*. Furthermore, on comparison with the detailed description for *Streptomyces lavendulae* such differences as exist are of minor character and, therefore, the eleven isolates are considered to be members of the species *Streptomyces lavendulae*.

All of the cultures produce sporophores terminating in spore chains which, early in the development of the culture, are wavy and which progress with further incubation to a coiled state, terminating in a tight coil which often gives the appearance of a ball. All cultures, therefore, following the classification of Pridham, Hesseltine and Benedict, fall in the Section "Spira." According to Pridham, Hesseltine and Benedict, a secondary classification, the "Series" is based on the color of the sporulating mycelium. All cultures, with the exception of MA–833, are members of the Red Series; whereas MA–833 clearly differs from the others and is grouped in the Gray Series.

In the paper by Pridham, Hesseltine, and Benedict, there are four valid pigment-forming species listed under the Spira Section—Red Series which are described in detail in *The Actinomycetes*, vol. 2, by S. A. Waksman. The Antibiotic 235A producers listed above (with the exception of MA–833) may be differentiated from two of these previously-described species on the following bases. *Streptomyces purpurascens* produces aerial mycelium on Czapek agar, produces orange-colored growth on potato, shows poor hydrolysis of starch, and does not produce $H_2S$; *Streptomyces roseocitreus* produces rose-violet-colored growth on nitrate agars, produces a yellow soluble pigment on asparagine agar, lacks soluble pigment on gelatin or potato, and shows weak hydrolysis of starch.

The eleven cultures under consideration do not differ significantly from the species *Streptomyces lavendulae* or *Streptomyces griseoviridis* as described in *The Actinomycetes*, vol. 2. Because the original description of *Streptomyces lavendulae* was presented in 1916, whereas the description of *Streptomyces griseoviridis* was not published until 1956, it is considered that the eleven cultures which produce Antibiotic 235A should be characterized as *Streptomyces lavendulae*. This conclusion, based on the Pridham, Hesseltine and Benedict classification and the description contained in *The Actinomycetes*, vol. 2, agrees with that reached by the key contained in *Bergey's Manual of Determinative Bacteriology*, Seventh Edition.

The eleven Antibiotic 235A-producing isolates are distinct strains of the species *Streptomyces lavenduale*. The strain-defining characters are presented in Table 1 and consist of differences in shades of color of the aerial mycelium, differences in consistency of growth, differences in color and extent of growth on chemically defined media, differences in color of growth on potato, and differences in capacity to reduce nitrate.

The final organism remaining to be identified is *Streptomyces* MA–833. Culture MA–833 is distinguished by formation of spiral spore chains, by production of a soluble brown pigment and by production of hydrogen sulfide.

On a complex medium, for example tomato paste agar, the culture grows heavily but differs sharply from the other Antibiotic 235A producers by producing distinctly gray-colored spores with no overtones of red or lavender. Gray-colored spores are produced also on chemical defined media.

An attempt was made to trace the culture through the key to the Species of Genus *Streptomyces* published in *Bergey's Manual of Determinative Bacteriology*, Seventh Edition, taking into consideration the gray-colored spores in complex medium. No known species was found to which MA–833 could be assigned.

Further consideration was given to the nine soluble-pigment-forming species in the section Spira-Gray Series listed in the paper by Pridham, Hesseltine and Benedict which are described in detail in *The Actinomycetes*, vol. 2. MA–833 could be distinguished from the nine cultures on the basis of the following characteristics: *Streptomyces aureus* is characterized by the lack of aerial mycelium on organic agar and by light-orange-colored growth on dextrose asparagine agar; *Streptomyces collinus* produces no soluble pigment on potato and a carmine-red soluble pigment on dextrose-asparagine agar; *Streptomyces cyaneus* produces blue-colored growth on a variety of media and shows weak hydrolysis of starch; *Streptomyces filipiensis* produces a yellow-colored soluble pigment on both Czapek agar and glycerol asparagine agar; *Streptomyces fimbriatus* shows abundant growth on Czapek agar, a reddish soluble pigment on gelatin, and is a plant pathogen; *Streptomyces griseochromogenes* lacks spiral spore chains and produces orange-colored growth on Czapek agar; *Streptomyces griseoruber* produces reddish-orange growth on Czapek agar, reddish-orange growth and a yellow soluble pigment on starch agar; *Streptomyces hawaiiensis* shows only slight liquefaction of gelatin and slight hydrolysis of starch; and *Streptomyces olivochromogenes* is characterized by a soluble pigment on dextrose asparagine agar and slow liquefaction of gelatin.

No species of microorganism is known whose major characters agree adequately with MA–833. In view of the characteristic spore coloration on tomato paste agar, which clearly distinguishes it from other 235A-producing streptomycetes, it has been decided that recognition should be given to this distinctive type by the coining of a new species designation. The name *Streptomyces avidinii* has been assigned in recognition of the unusual nature of the culture and of the first recognition that the biotin-binding agent, Streptavidin, can be produced by a microorganism.

The new antibiotic 235A of the present invention comprises at least two substances, one of which is designated as substance 235S, this material being of relatively small molecular weight. The other of the two substances is designated as 235L and has a relatively large molecular weight. Substance 235L, which is also called "Streptavidin" is a protein-like substance. The new antibiotic 235A is unusual in its activity in that its individual components have no antibiotic activity against pathogenic microorganisms in and of themselves except when assayed on specially prepared media, but are active against pathogenic microorganisms when mixtures of the two components are tested against pathogenic microorganisms. Thus, the new antibiotic 235A is comprised of a synergistic pair of substances designated as 235S and 235L, or Streptavidin.

Antibiotic 235S acts as a relatively low molecular weight material which may be separated into at least three components, designated as $235S_1$, $235S_2$ and $235S_3$, by paper chromatographic procedures.

Thus, using the following solvent systems for development of the chromatograms, the $R_f$'s of three individual components are determined using a preparation of Antibiotic 235S isolated from fermentation broth by ion exchange procedures. Solvent system I is n-butyl alcohol saturated with aqueous 0.25M disodium hydrogen phosphate (pH 9.3) buffer solution. Solvent system II is n-butyl alcohol saturated with 0.1N ammonium hydroxide solution. In each case the paper is first saturated with the aqueous buffer or the aqueous ammonia solution before applying the sample to the paper. Development time is 6 to 17 hours. The results are as follows.

|  | System I | System II, 6 hours |
|---|---|---|
| $235S_1$ | $R_f=0.14$ | $R_f=0.15$ |
| $235S_2$ | $R_f=0.28$ | $R_f=0.33$ |
| $235S_3$ | $R_f=0.47$ | $R_f=0.51$ |

Each of the low molecular weight components of Antibiotic 235S is characterized by the property of inhibiting the intracellular synthesis of biotin by gram negative microorganisms.

Antibiotic $235S_3$ has been obtained in crystalline form by methods described below. Antibiotic $235S_3$ gives reactions characteristic of primary amines and is soluble in water, lower alkanols such as methanol, ethanol, isopropanol, n-butanol and in aqueous acetone solutions. Antibiotic 235S$_3$ can be crystallized from alkaline aqueous solutions by the addition of acetone. The crystalline antibiotic 235S$_3$ prepared in this manner has a melting point of about 217° C.

Antibiotic 235S$_3$ is an optically active compound having a rotation of $[\alpha]_D^{25} = +8.5°$ (C., 2 in 0.1N hydrochloric acid) and $[\alpha]_D^{25} = +9.5$ (C., 2 in 3.5 N hydrochloric acid).

A solution of antibiotic 235S$_3$ exhibits no discernible maxima in the ultraviolet absorption range.

The infrared absorption of a sample of crystalline Antibiotic 235S$_3$ suspended in a mineral oil (Nujol) was taken on a Baird Associates Model 12B infrared spectrophotometer using a sodium chloride prism and showed a number of characteristic peaks, the more significant of which are at the following wavelengths, expressed in microns: 3.04, 3.7–4.8 and 6–6.6. The infrared spectrum is illustrated in FIG. 1 of the attached drawings. It should be noted that the infrared absorption spectrum is a measure of the absorption of Antibiotic 235S$_3$ in crystalline form prepared by slowly adding acetone to an aqueous ammoniacal solution of Antibiotic 235S$_3$. Although only one crystalline form has been obtained, many substances exist as polymorphic modifications, in which case the infrared absorption spectrum may exhibit minor differences between the various crystalline forms.

Antibiotic 235S$_3$ contains the elements carbon, hydrogen, nitrogen and oxygen. The following is an analysis of the elemental composition obtained on a sample of crystalline 235S$_3$:

| | |
|---|---|
| Carbon | 63.1 |
| Hydrogen | 8.9 |
| Nitrogen | 13.04 |
| Oxygen (by difference) | 14.96 |

Antibiotic 235S$_3$ is a primary amine which forms salts on reaction with acids. Thus, on reaction with strong inorganic acids such as hydrochloric acid, sulfuric acid, hydrobromic acid and phosphoric acid, the corresponding amine acid salt is formed. Likewise, on reaction with organic acids the salt of antibiotic 235S$_3$ and the organic acid are formed.

The basic nature of Antibiotic 235S$_3$ is also a distinguishing characteristic of this new compound. Thus, when a sample of Antibiotic 235S$_3$ is titrated potentiometrically with 0.1N hydrochloric acid, two basic binding groups are observed. The first binding occurs at a pH of about 5.5. The second binding occurs at a pH of about 8.5. This titration indicates a pH$_{1/2}$ of about 7.5 and a molecular weight of 373.

Antibiotic 235S$_3$ gives a negative reaction under the conditions of the Biuret test. On hydrolysis with refluxing 6N hydrochloric acid the hydrolysis product is an α-amino acid which has an R$_f$ of 0.52 by paper chromatography using a solvent system consisting of 100 parts of butanol, 12 parts of glacial acetic acid and 100 parts of water and ninhydrin reagent to locate the amino acid spot on the chromatogram. This amino acid has an M.P. of 240–241° C.

Antibiotic 235S$_2$, on the other hand, gives a positive Biuret test, indicating the presence of an amide linkage. On hydrolysis with refluxing 6N hydrochloric acid there is obtained a mixture of amino acids, one of which gives an R$_f$ of 0.52 using the paper chromatographic assay employed for the Antibiotic 235S$_3$ hydrolysis product.

An osmometer determination of the molecular weight of Antibiotic 235S$_3$ gives a value of 322 which, taken together with the microanalytical data, indicates a molecular formula in accordance with the following: $C_{17}H_{28}N_3O_3$. In view of the fact that the molecular weight, as determined by the osmometer, is a measure of a colligative property of the molecule, it is believed to be a more reliable method of estimating the molecular weight than the titration which is sensitive to error in the event that small amounts of strong acidic or basic impurities are present.

Antibiotic substance 235L, the second of the synergistic pair of antibiotics included in Antibiotic 235A, has also been prepared in crystalline form by the methods described below. A solution of Antibiotic 235L exhibits a single maximum in the ultraviolet absorption region at 282 millimicrons $$(E_{1cm}^{1\%} = 47).$$

The melting range of the antibiotic is from 220–230° C. with decomposition.

Antibiotic 235L contains the elements carbon, hydrogen, nitrogen, sulfur and oxygen. The following is an analysis of the elemental composition obtained on a sample of crystalline Antibiotic 235L:

| | |
|---|---|
| Carbon | 51.1 |
| Hydrogen | 7.4 |
| Nitrogen | 16.4 |
| Sulfur | 0.2 |
| Oxygen (by difference) | 24.9 |

The carbohydrate content of the 235L molecule when measured by the orcinol method of Weimer, H. E. and Moshim, J. R. in *Arch. Biochem. & Biophys.* 92, 97 (1952) is nil. When the modified Molisch test [Dische Z., *Mikrochemie* 7, 33 (1929)] is employed, the 235L molecule is found to contain less than 1.0% hexose.

The relatively large molecular weight of Antibiotic 235L is indicated by the fact that it is not dialyzable through a cellophane membrane. A determination of the molecular weight by ultracentrifugation indicates a molecular weight of approximately 60,000.

When submitted to the disc electrophoresis procedure on 7.5% polyacrylamide gel according to the method described by Reisfeld et al. in *Nature* 195, 281 (1962), Antibiotic 235L separates into bands in a characteristic pattern. The 7.5% polyacrylamide gel is suspended in a column with pH 8.7 phosphate buffer and 0.01 ml. of a solution of Streptavidin is applied to the top of the column. The electrophoresis is run for 1 hour at 5 milliamperes and 100 volts. The procedure is also carried out with Avidin, a previously-known protein of approximately the same molecular weight. The bands developed by the electrophoresis procedure are stained with bromphenol blue. The bands resulting from electrophoresis of Antibiotic 235L (Streptavidin) show the presence of major amounts of the two proteins and minor amounts of two different proteins moving intimately together toward the anode. The pattern developed by the electrophoresis of Avidin shows six widely-separated bands, of which only two minor components are in the region of Antibiotic 235L.

Antibiotic 235L appears to be a protein-like or polypeptide type compound since acid hydrolysis at elevated temperatures yields hydrolysis products which give a positive test with ninhydrin reagents, indicating cleavage of amide bonds. Antibiotic 235L has only a limited solubility in water of less than about 1 milligram per milliliter. However, the solubility in water may be increased up to about 10 milligrams per milliliter by the addition of varying amounts of sodium chloride to the solution.

Antibiotic 235A is active in inhibiting the growth of gram-negative microorganisms. Although the individual components of Antibiotic 235A, i.e. Antibiotics 235S and 235L, when tested alone in conventional assay systems, are ineffective in inhibiting the growth of pathogenic microorganisms, the combination of the two as Antibiotic 235A, acts synergistically. Thus, Antibiotic 235A, as a mixture of equal parts of 235S and 235L, is effective in inhibiting the growth of *Salmonella typhosa 2866, Salmonella schottmuelleri MI, Escherichia coli W* and *Shigella sonnei 1832*.

Antibiotic 235A is a relatively nontoxic material. Using mice as the test animals, as much as 500 mg./kg. of the 235S component and 400 mg./kg. of the 235L component are tolerated when injected intraperitoneally into the mouse without any observable toxic manifestations.

The new antibiotic, 235A, is useful as an agent for inhibiting the growth of gram-negative pathogenic organisms. It is also useful in obtaining pure cultures of microorganisms where a susceptible organism may be separated from a resistant one. When Antibiotic 235A is separated into its individual components 235S and 235L, the individual components may be used as aids in the search for other similar materials. Thus, 235S acts as an inhibitor of the growth of microorganisms in media which contain no exogenous biotin, but is completely inactive in systems containing biotin-active substances in inhibiting the growth of microorganisms. In this manner, Antibiotic $235S_3$ may be employed in microbiological assay systems to test for the presence of biotin or related biotin-active materials.

Antibiotic 235L, on the other hand, acts as a biotin-complexing agent and, thus, permits Antibiotics 235S to act as an inhibitor of the growth of pathogenic microorganisms. Antibiotic 235L is thus an effective laboratory tool which may be used in screening unknown samples of microorganisms for their ability to produce antibiotics which act primarily by the inhibition of biotin synthesis by various pathogenc microorganisms.

The antibiotic activity of Antibiotic 235A as determined by the agar diffusion method or the tube dilution assay method, using *Escherichia coli* growing in a natural medium. The assay of 235A is complicated by the fact that it is composed of a larger molecular weight substance which diffuses slowly and low molecular weight substances which diffuse rapidly. As a result, the usual agar diffusion assays measure only the amount of the slow-diffusing component present since the rapid-diffusing material is not active by itself in ordinary assays. Once the two types of materials have been separated, it is possible to prepare assay plates with addition of a sufficient amount, 90 $\gamma$/ml., of the large molecular weight compound to the assay so that its diffusion will not limit the activity of the small components. The agar diffusion method is carried out as follows:

A flask containing 150 ml. of an assay medium composed of beef extract 0.3%, peptone 0.5%, yeast extract 0.2%, agar 1.5% and water to volume is sterilized by autoclaving for 20 minutes at 120° C. under 18 pounds/sq. in. The liquid agar held at 45–50° C. is inoculated with 5 ml. of an overnight 37° C. nutrient broth culture of *Escherichia coli W* which had been adjusted to a cell density of 60 on a Lumetron colorimeter using a 600 m$\mu$ filter. Five ml. of the seeded agar is then pipetted into a standard 90 mm. sterile plastic petri dish and allowed to solidify. Following solidification the dish is refrigerated until use within the ensuing 24 hours.

In carrying out the assay, a standard 12.7 mm. paper disc is soaked with the antibiotic solution and then tapped dry on paper toweling and placed on the surface of an *Escherichia coli W* seeded agar plate. The plates are incubated at 25° for 18–24 hours. Antibiotic potency is then determined by measuring the zone of inhibition around the disc in millimeters.

The tube dilution assay is carried out as follows: A solution is made by adding 32 grams of Difco Phenol Red Broth Base and 20 grams of dextrose to 1000 ml. distilled water. Two milliliters of the solution are added to a test tube. Nine other test tubes containing two milliliters each of the above solution diluted with 2 ml. of water are also prepared. Two milliliters of the antibiotic solution are added to the first tube and mixed. Two milliliters of the resultant solution are then transferred to the second tube and mixed. Two milliliters from this second tube are transferred to the third tube and mixed. This procedure is repeated to the tenth tube from which two milliliters of resulting solution are removed and discarded. To each of the ten tubes is added one drop of Lumetron 60 inoculum prepared as described above from a 5 ml. serological pipette. The tubes are then incubated in a water bath at 37° for approximately 2 hours until the control tube (one with half-strength nutrients but no antibiotic) has turned from its original red color to a complete yellow. The 10-tube series is then examined and the tube with the highest dilution that is still red colored is considered to contain the minimal inhibitory concentration (MIC) of the antibiotic.

The presence of Antibiotic 235L can be determined by routine agar diffusion methods using *E. coli*, provided sufficient Antibiotic 235S is incorporated in the agar. Because of the large molecular weight and correspondingly low change in slope with dilution, this method lacks precision. With regular nutrient agar, the presence of 0.6 mg./ml. of Antibiotic 235S has been found to yield satisfactory results.

The amount of Antibiotic 235L can be somewhat more precisely determined by using the standard tube dilution assay with *E. coli* adding an excess of Antibiotic 235S (100$\gamma$) to the assay medium. The result is expressed as $\gamma$/ml. required for minimal inhibitory concentration (MIC).

Antibiotic 235S can be determined quantitatively on agar diffusion plates using *E. coli*. If nutrient agar is used, 90$\gamma$ of Antibiotic 235L per ml. of agar is satisfactory. If a synthetic assay medium is used, no Antibiotic 235L is required.

In the latter case, the activity is inhibited if biotin is incorporated into the agar. This method is used for confirmation of the production of 235 type antibiotics by cultures obtained in the screening program.

Antibiotic 235S can also be determined by tube dilution methods in the presence of an excess of Antibiotic 235L.

In the tube dilution assay the minimal inhibatory concentration of the antibiotic components are 0.5 $\gamma$/ml. for Antibiotic 235L, 25 $\gamma$/ml. for Antibiotic $235S_2$ and 31 $\gamma$/ml. for Antibiotic $235S_3$.

The production of the new Antibiotic 235A is carried out by the submerged aerobic fermentation of various strains of *Streptomyces lavendulae* or *Streptomyces avidinii* in suitable aqueous mediums. Aqueous mediums such as those which are useful for the production of other known antibiotics are, in general, suitable for the production of Antibiotic 235A. Such mediums contain sources of carbon and nitrogen assimilable by the microorganism and certain inorganic salts essential to the rapid growth of the microorganisms. In addition, the fermentation medium contains traces of metals necessary for the growth of the microorganism which are usually present in complex sources of carbon and nitrogen in the medium.

In general, carbohydrates such as sugars, for example, dextrose, sucrose, dextrin and the like, are suitable sources of assimilable carbon. The exact quantity of the carbon source will depend, in part, upon the other ingredients of the medium, but it is usually found that an amount of carbohydrate between about 1 and 6% by weight of the medium is satisfactory. These carbon sources can be used individually or several such sources may be combined in the medium.

Various nitrogen sources such as casein hydrolysates, amino acids, for example asparagine, glycine, arginine, digests of soybean meal, soybean meal, distiller's solubles and the like, are readily assimilated by the antibiotic 235A-producing microorganisms and can be used in fermentation mediums for the production of this antibiotic. In general, we find that organic sources of nitrogen, particularly soybean meal, are very satisfactory for the production of the new antibiotic. The various organic and inorganic sources of nitrogen can be used either alone or in combination in amounts ranging from about 0.2 to about 6% by weight of the aqueous medium.

The following are examples of mediums suitable for growing *Streptomyces avidinii* MA 833 and the *Streptomyces lavendulae* cultures which produce Antibiotic 235A.

MEDIUM NO. 1

| | Percent |
|---|---|
| Yeast extract | 1 |
| Dextrose | 1 |
| Agar | 2 | dissolved in water.

MEDIUM NO. 2

| | Percent |
|---|---|
| Bacto Peptone | 0.5 |
| Meat Extract | 0.3 |
| Dextrose | 1 |
| Yeast Extract | 0.1 | dissolved in water. The pH of the solution is adjusted to 7.0

MEDIUM NO. 3

| | | |
|---|---|---|
| Dextrose | percent | 1 |
| Asparagine | percent | 0.1 |
| $K_2HPO_4$ | percent | 0.01 |
| $MgSO_4 \cdot 7H_2O$ | percent | 0.05 |
| Yeast Extract | percent | 0.05 |
| $ZnSO_4 \cdot 7H_2O$ | $\gamma/l$ | 300 |
| $FeSO_4 \cdot 7H_2O$ | $\gamma/l$ | 250 |
| $MnSO_4 \cdot H_2O$ | $\gamma/l$ | 45 |
| $CuCl_2 \cdot 2H_2O$ | $\gamma/l$ | 27 |
| $(NH_4)_6M_oO_{24} \cdot 2H_2O$ | $\gamma/l$ | 19 |
| Boric Acid | $\gamma/l$ | 55 |
| $CaCl_2$ | mg./l | 1 |
| $M_9SO_4 \cdot 7H_2O$ | $\gamma/l$ | 250 | dissolved in water. The pH of the solution is adjusted to 7.0.

MEDIUM NO. 4

| | | |
|---|---|---|
| Dextrose | g | 10.0 |
| Dl-Asparagine | g | 1.0 |
| $K_2HPO_4$ | g | 0.1 |
| $MgSO_4 \cdot 7H_2O$ | g | 0.5 |
| $FeSO_4 \cdot 7H_2O$ | g | 0.01 |
| Yeast Extract | g | 0.5 |
| Distilled $H_2O$ | g | 2000 |

The pH of the solution is adjusted to 7.2.

MEDIUM NO. 5

| | | |
|---|---|---|
| Soybean Meal | g | 30.0 |
| Distillers Solubles | g | 7.5 |
| Cerelose | g | 20.0 |
| NaCl | g | 2.5 |
| $CaCO_3$ | g | 10.1 |
| Distilled $H_2O$ | ml | 1000 |

The pH of the solution is adjusted to 7.0.

After completion of the fermentation, the antibiotic is recovered from the fermentation liquor by contacting the filtered broth with a strongly acid cation exchange resin. A typical example of the cation exchange resin used in the recovery of Antibiotic 235A is Dowex 50 X 2 which contains a styrene divinyl benzene copolymer having sulfonic groups substituted throughout the resin matrix. In contacting the fermentation broth with the cation exchange resin, the major portion of Antibiotic 235S (the smaller molecular weight component) is adsorbed on the resin along with a minor amount of Antibiotic 235L. The major portion of the Antibiotic 235L passes through the resin and is recovered from the effluent by procedures which are described below.

The effluent from the resin contains Antibiotic 235L, which is recovered in crude form by precipitation with ammonium sulfate. The crude Antibiotic 235L is further purified by reprecipitation from aqueous solution using either acetone or ethanol as the precipitant. The crude precipitate may also be alternatively purified by dialysis of an aqueous solution of the crude material followed by precipitation of the partially purified Antibiotic 235L from the dialysis residue using acetone as the precipitating agent. Antibiotic 235L is also isolated from the dialysis residue by chromatography over a Sephadex G25 column in order to remove residual salt and then rechromatographed using diethylamino ethyl cellulose as the adsorbent. Antibiotic 235L is recovered from the effluent of the diethylamino ethyl cellulose column by partial evaporation and cooling to crystallize the antibiotic material.

Antibiotic 235S is recovered from the ion exchange resin adsorbate by elution of the resin with dilute ammonia. The ammonia eluate of the resin containing crude Antibiotic 235S admixed with a small amount of the Antibiotic 235L is further purified according to one procedure by readsorption on Dowex W 50 X ion exchange resin. On elution of the readsorbed Antibiotic 235S from the resin with dilute ammonia, crystalline Antibiotic 235S is obtained by concentration of selected fractions and crystallization from water/acetone mixtures at alkaline pH.

Alternatively, the Dowex W 50 X eluate containing Antibiotic 235S may be purified further by extraction with butyl alcohol and readsorption of the extract on Dowex W 50 X resin. Crystalline material is then obtained from the selected fractions of the eluate on concentration.

EXAMPLE 1

A fermentation medium having the following composition is prepared and the pH adjusted to 7.0:

| | | |
|---|---|---|
| Dextrose | percent | 1 |
| Asparagine | percent | 0.1 |
| $K_2HPO_4$ | percent | 0.01 |
| $MgSO_4 \cdot 7H_2O$ | percent | 0.05 |
| Yeast Extract | percent | 0.05 |
| $ZnSO_4 \cdot 7H_2O$ | $\gamma/l$ | 300 |
| $FeSO_4 \cdot 7H_2O$ | $\gamma/l$ | 250 |
| $MnSO_4 \cdot H_2O$ | $\gamma/l$ | 45 |
| $CuCl_2 \cdot 2H_2O$ | $\gamma/l$ | 27 |
| $(NH_4)_6M_oO_{24} \cdot 2H_2O$ | $\gamma/l$ | 19 |
| Boric Acid | $\gamma/l$ | 55 |
| $CaCl_2$ | mg./l | 1 |
| $M_9SO_4 \cdot 7H_2O$ | $\gamma/l$ | 250 | dissolved in water.

Approximately 1,000 gallons of an aqueous medium of the above composition is sterilized and inoculated with a vegetative inoculum of cultures of *Streptomyces avidinii* MA 833. The vegetative inoculum is prepared in the following manner. A sterile aqueous medium is inoculated with the contents of one lyophilized tube of viable *Streptomyces avidinii* MA 833, the composition of the medium consisting of 1% yeast extract and 1% dextrose in water. Agar slants are prepared from this suspension of microorganisms and after development for 4 to 5 days at 28° C. the developed spores are scraped into a suspension of sterile aqueous medium consisting of 0.1% yeast extract, 1% dextrose, 0.5% bacto peptone, and 0.3% meat extract. The spore suspension thus prepared is then added to a 2-liter baffled Erlenmeyer flask containing 500 ml. of sterile aqueous medium No. 2. The inoculated medium is then incubated at 28° on a rotary shaker for approximately 24 hours, during which time a heavy vegetative growth of the culture takes place.

The vegetative culture prepared in the above manner is then added to a fermentor containing approximately 30 to 40 gallons of a sterile medium having the composition described as Medium No. 2 above. The inoculated medium is then incubated at 28° C. for about 48 hours, during which time the medium is vigorously agitated and aerated to form a heavy vegetative growth of the culture.

Approximately 8.4% of the vegetative culture prepared in the above manner is added to 120 gallons of a sterile medium having the composition described as Medium No. 2 above, and the inoculated medium incubated at 28° C. for about 36 hours during which time the medium is agitated and vigorously aerated.

The antibiotic content of the fermentation broth is followed by the agar diffusion assay or the tube dilution assay method, using the organism *Escherichia coli* as described above. When the antibiotic activity reaches a peak in approximately 24 to about 60 hours, the fermentation is terminated and the fermentation broth harvested from the fermentor.

Approximately 120 gallons of the fermentation broth prepared in the manner described above is filtered and the cells discarded. The filtrate containing the antibiotic activity is adjusted to pH 5 and percolated through a column containing 8 liters of Dowex W 50 X (a strongly acidic cation exchange resin having a styrene divinyl benzene matrix which derives its exchange capacity from the presence of sulfonic acid groups contained in the resin matrix) on the sodium cycle at a rate of about 800 mls. per minute. Following adsorption of the antibiotic activity on the resin, the resin is washed with water and eluted using 0.5N ammonium hydroxide at an elution rate of 250 mls. per minute. The principal amount of the antibiotic activity is collected in approximately four 2-liter fractions of eluate containing a major amount of Antibiotic 235S and a minor amount of Antibiotic 235L.

The second and third fractions are combined and the pH adjusted to 7.5, then evaporated to a volume of about 440 mls. Approximately 90 mls. of this Dowex W 50 X concentrated eluate is dialyzed in a cellophane bag using three 1-liter volumes of water as the dialysis liquid. Dialysates are then combined and evaporated to approximately 80 mls. Neither the dialysate concentrate nor the dialysis residue has any antibiotic activity when assayed against *Escherichia coli* in the tube dilution assay but on recombination of the residue and dialysate the resulting combination has antibiotic activity in the same *Escherichia coli* tube dilution assay.

EXAMPLE 2

Sixty mls. of Dowex W 50 X concentrated eluate prepared as described in Example 1 is chromatographed on a 1-liter Sephadex 25 column, the developing solvent for the chromatogram being distilled water. The initial 360 mls. of effluent volume is discarded, following which 27 fractions, 25 mls. each, are collected. No antibiotic activity is present in any of the collected fractions when assayed by *Escherichia coli* agar plate assay.

Two eluate concentrates are prepared by combination of fractions 1–9, inclusive, and fractions 17–20, inclusive. Fractions 1–9, inclusive, are concentrated to 20 mls. and contain concentrated solution of Antibiotic 235L which is recovered by lyophilization. Fractions 17–20, inclusive, are evaporated to 10 mls. and the partially purified Antibiotic 235S is recovered in solid form by lyophilization of the concentrate.

The above chromatography experiment is repeated using 60 mls. of the same Dowex W 50 X concentrated eluate as starting material. Eluate fractions 8 and 9 from the chromatographic column are combined and concentrated. After standing, Antibiotic 235L crystallizes from solution and is recovered by filtration.

EXAMPLE 3

One thousand twenty gallons of filtered fermentation broth prepared in the manner described in Example 1 is adsorbed by passage through Dowex W 50 X 2 resin and the resin adsorbate eluted with 0.5N ammonium hydroxide solution. A 2.6 liter fraction of the eluate (1/16 of the total volume) is adjusted to pH 9 using aqueous sodium hydroxide solution, and extracted with three 6-liter portions of n-butyl alcohol. The n-butyl alcohol extract is diluted with water and evaporated *in vacuo* to a volume of 2800 mls. One liter of the n-butyl alcohol concentrate is further evaporated to a volume of 40 mls. and chromatographed over a 2-liter Sephadex 25 (dextran) chromatography column. The effluents from the column high in total solids are adjusted to pH 3.8 and adsorbed on 50 mls. of Dowex W 50 X 2 resin at a rate of 1 ml. per minute. The resulting resin absorbate is eluted with 0.2N ammonium hydroxide solution and ammoniacal eluate fractions, 25 ml. in volume, collected. Fractions Nos. 11 and 12, comprising 50 mls., are evaporated to approximately one-half the volume and diluted with 96 mls. of acetone to induce crystallization. The crystals obtained in this manner are Antibiotic $235S_3$ in substantially pure form.

The resin eluate fractions Nos. 6–10, inclusive, are combined and concentrated to approximately 20 mls., and 120 mls. of acetone added to induce crystallization. The resulting 1.2 grams of crystals are found to consist of a mixture of Antibiotic $235S_3$ and Antibiotic $235S_2$ in approximately a 9:1 ratio.

EXAMPLE 4

Approximately 1,000 gallons of filtered fermentation broth prepared in accordance with the procedure described in Example 1 are passed through approximately 80 liters of Dowex W 50 X 2 resin. The effluent from the resin column adsorption is treated with ammonium sulfate at the rate of 500 g. ammonium sulfate per liter of effluent and the resulting precipitate separated by filtration. The precipitate is dissolved in approximately 9 gallons of water and dialyzed in cellophane bags for approximately 24 hours. The residue from the dialysis is diluted with 1.5 volumes of acetone to precipitate a crude material comprising Antibiotic 235L. The crude precipitate is dissolved in water, reprecipitated with ethyl alcohol and dried. Approximately 50 grams of the solid prepared in this manner is slurried in water, centrifuged and the supernatant solution is chromatographed over 5.5 liters of Sephadex 25 using distilled water as the developing solvent. Approximately 1550 mls. of solution containing substantially pure Antibiotic 235L is collected and freeze dried. One gram of the solids prepared in this manner is dissolved in 25 mls. of water, and the aqueous solution passed through 15 mls. of diethylaminoethyl cellulose. The combined effluent is concentrated to approximately 5 mls. and cooled, whereupon substantially pure crystals of Antibiotic 235L having a melting point of 225–229° C. are obtained.

Various changes and modifications of the invention can be made, and to the extent that such variations incorporate the spirit of this invention, they are intended to be included within the scope of the appended claims.

We claim:

1. The process for Producing Antibiotic 235A which comprises cultivating *Streptomyces lavendulae* (NRRL 3076) or *Streptomyces avidinii* (NRRL 3077) in an aqueous nutrient medium until subtantial antibiotic activity is produced and imparted to the said nutrient.

2. The process according to Claim 1 wherein the microorganism is *Streptomyces avidinii* NRRL 3077.

3. The process according to Claim 1 wherein the microorganism is *Streptomyces lavendulae* NRRL 3076.

4. The product Antibiotic 235A produced according to the process of Claim 1.

5. Antibiotic $235S_3$ or its acid addition salts, said antibiotic having the following properties:
   (a) giving reactions characteristic of primary amines and forming salts with acids;
   (b) soluble in water, methanol, ethanol, isopropanol, n-butanol, and aqueous acetone solutions;
   (c) crystallizable from aqueous alkaline solutions by the addition of acetone;
   (d) melting at about 217° C.;
   (e) being optically active and having a rotation of
       $[\alpha]_D^{25} = +8.5$ (c.=0.2 in 0.1M HCl) and
       $[\alpha]_D^{25} = +9.5$
       (c.=0.2 in 3.5N HCl);
   (f) exhibiting no discernible maxima in the UV absorption range;

(g) having an IR absorption as shown in FIG. 1;
(h) containing the elements carbon, hydrogen, nitrogen, and oxygen;
(i) having a basic binding group at a pH of about 5.5 and a second binding group at a pH of about 8.5 when titrated with 0.1N HCl;
(j) having an indicated pH ½ of about 7.5 and a molecular weight of 373;
(k) having a negative Biuret test; and
(l) having a molecular formula of $C_{17}H_{28}N_3O_3$.

References Cited

Baggaley et al.: J. Chem. Soc., D. Chem. Comm. 1969 (3), 101–102.

JEROME D. GOLDBERG, Primary Examiner

U.S. Cl. X.R.

424—115, 118; 195—80